J. H. TAUSSIG.
VERTICAL RETORT COAL GAS APPARATUS.
APPLICATION FILED FEB. 1, 1908.

969,996.

Patented Sept. 13, 1910.

J. H. TAUSSIG.
VERTICAL RETORT COAL GAS APPARATUS.
APPLICATION FILED FEB. 1, 1908.

969,996.

Patented Sept. 13, 1910.
5 SHEETS—SHEET 2.

FIG. IA.

WITNESSES:

INVENTOR
John Hawley Taussig
BY
Augustus B. Stoughton.
ATTORNEY.

J. H. TAUSSIG.
VERTICAL RETORT COAL GAS APPARATUS.
APPLICATION FILED FEB. 1, 1908.

969,996.

Patented Sept. 13, 1910.
5 SHEETS—SHEET 4.

UNITED STATES PATENT OFFICE.

JOHN HAWLEY TAUSSIG, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

VERTICAL-RETORT COAL-GAS APPARATUS.

969,996.

Specification of Letters Patent. Patented Sept. 13, 1910.

Application filed February 1, 1908. Serial No. 413,784.

*To all whom it may concern:*

Be it known that I, JOHN HAWLEY TAUSSIG, a citizen of the United States, and a resident of Philadelphia, in the county of Philadelphia and State of Pennsylvania, have invented certain new and useful Improvements in Vertical-Retort Coal-Gas Apparatus, of which the following is a specification.

Objects of the present invention are to provide a vertical retort setting or gas making apparatus which shall be compact, efficient, durable and capable of ready repair as to those parts which are exposed to extreme heat and as to the patching of the recuperator, and which shall be flexible in operation having special regard to the adjustment of the secondary air; to so construct, design and arrange the apparatus as that the various dampers may be operated from the outside or externally; to protect the retorts, more particularly the lower portions thereof, from the hottest part of the flames of secondary combustion and to heat them evenly in a proper manner; to so construct and design the apparatus that the parts which are exposed to extreme heat are not called upon to carry the weight of the superincumbent structure; to permit of the use of hot fuel; to provide for arranging the furnace beneath the recuperator whereby space is saved; to construct the retort chamber of substantially the same width as the outlet of the furnace chamber, thus directing the heated products of combustion in a straight path toward the retorts; to provide for the satisfactory control of the heats or temperatures throughout the apparatus; to provide what may be called a combustion chamber in which the furnace products and secondary air are mixed, ignited and expanded, and from which the hot products of combustion escape into the retort chamber; and to provide for arranging the furnace beneath the retorts so that coke may be dumped from the latter into the former as well as into any suitable receptacle.

The nature and characteristic features of the invention will be more fully undertood from the following description taken in connection with the accompanying drawings forming part hereof, and in which—

Figure 1:
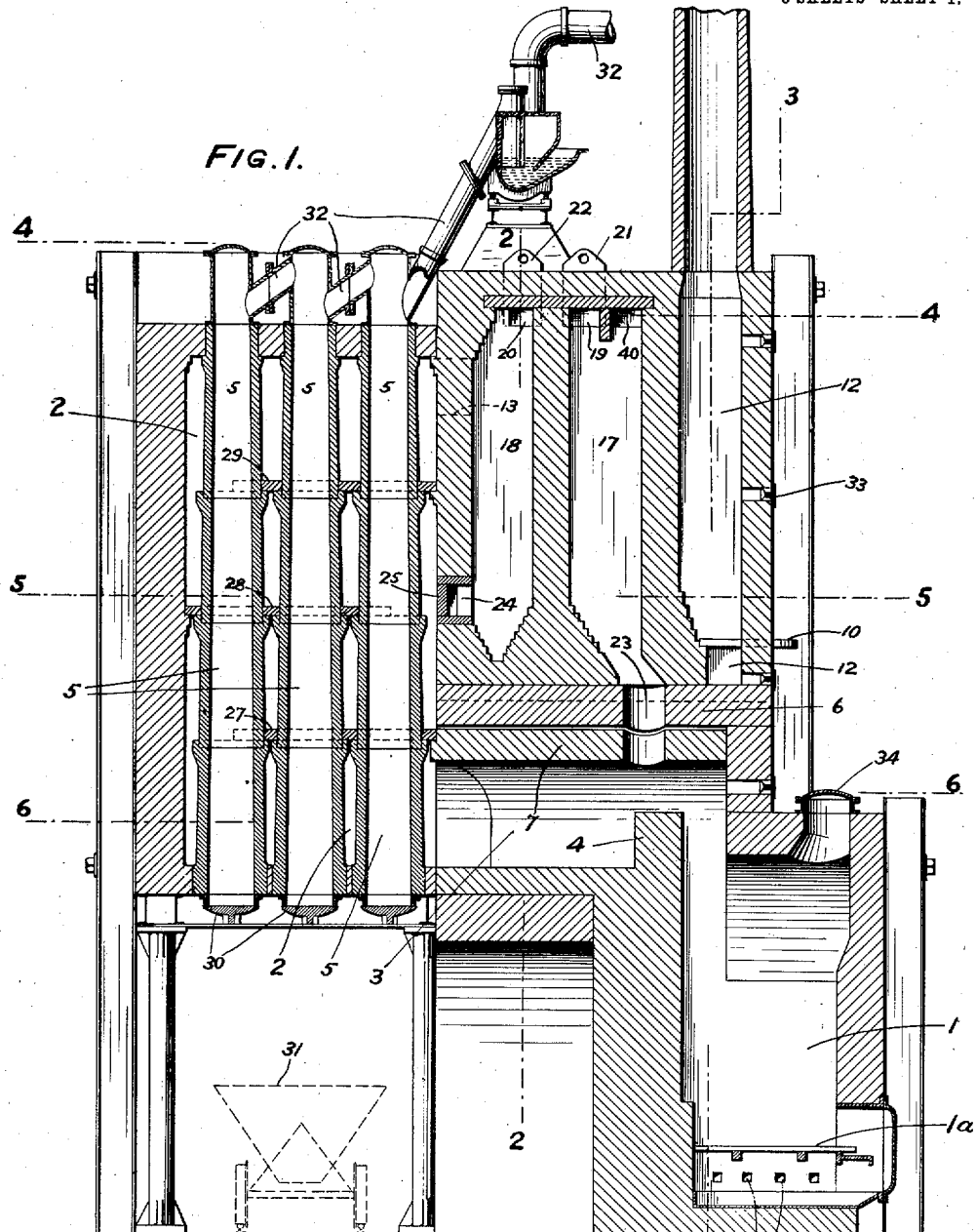
Figure 2:
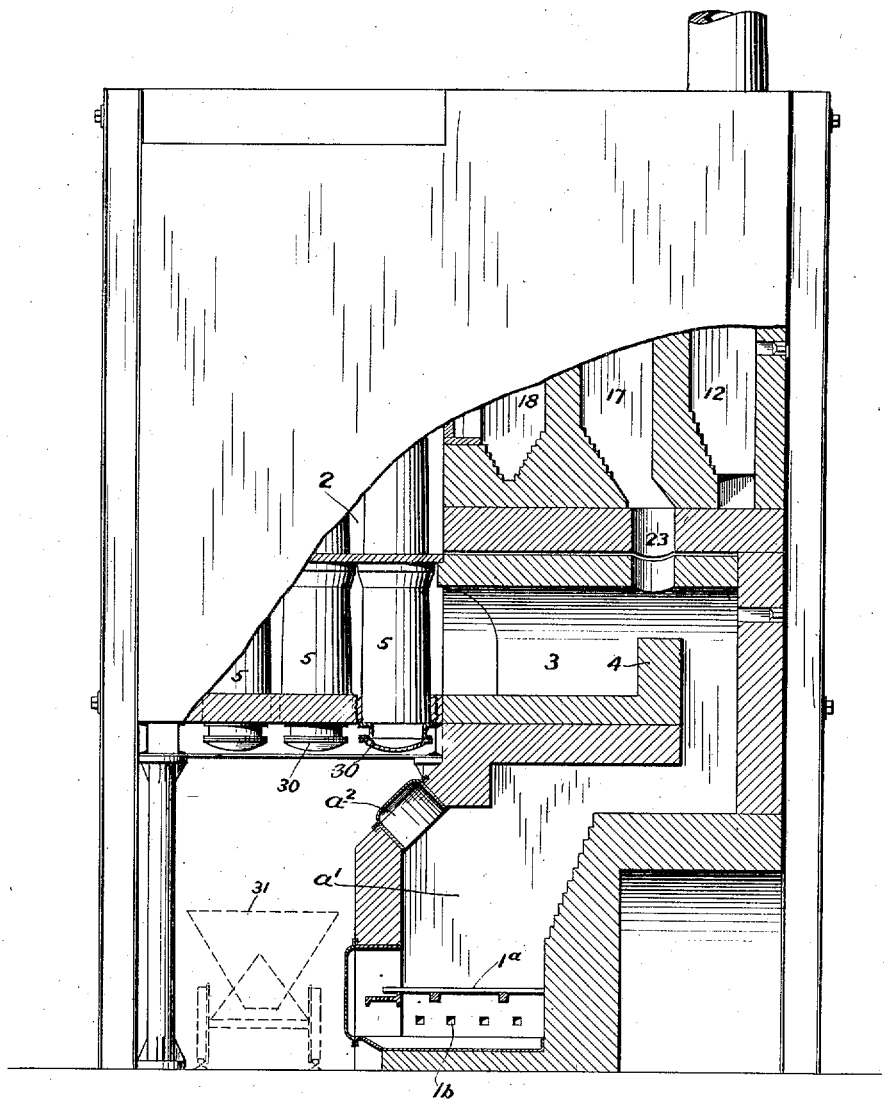
Figure 3:
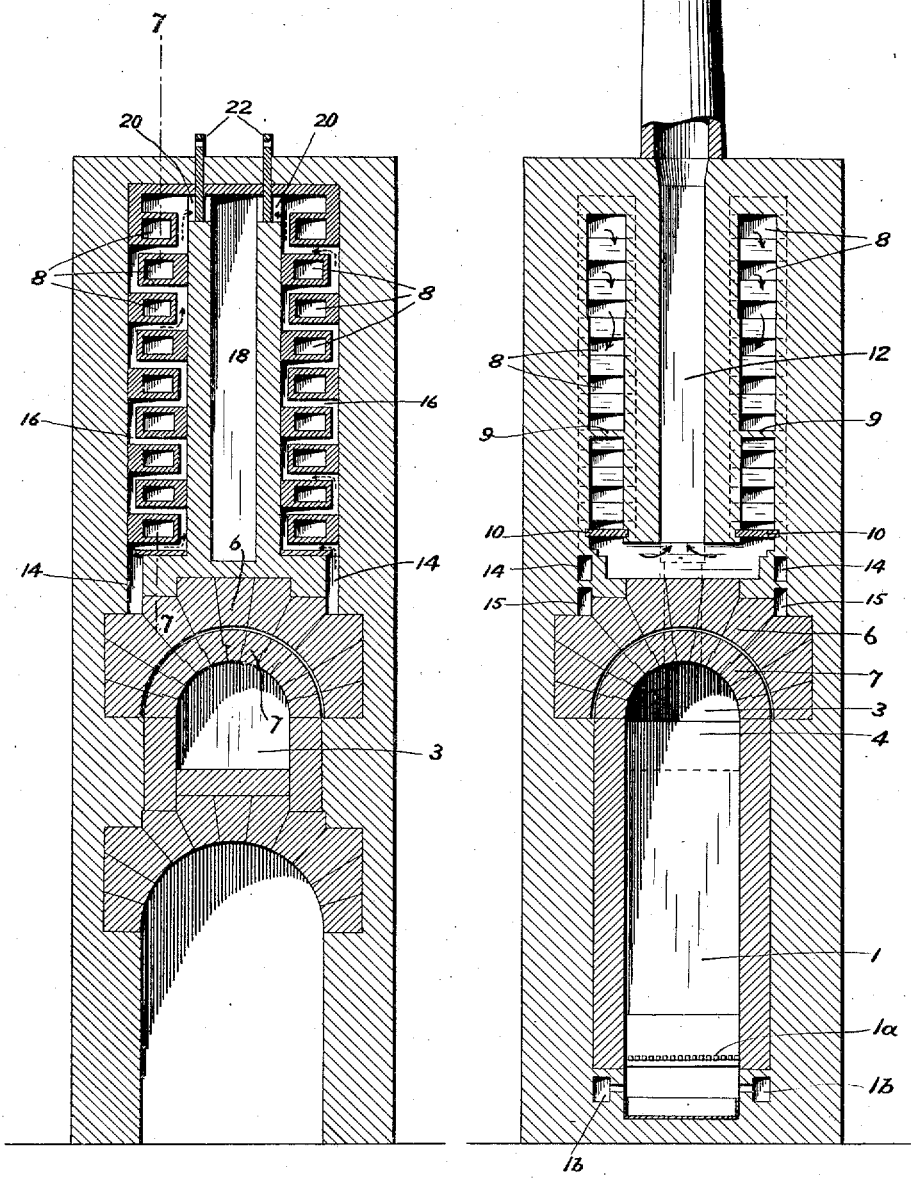
Figure 4:
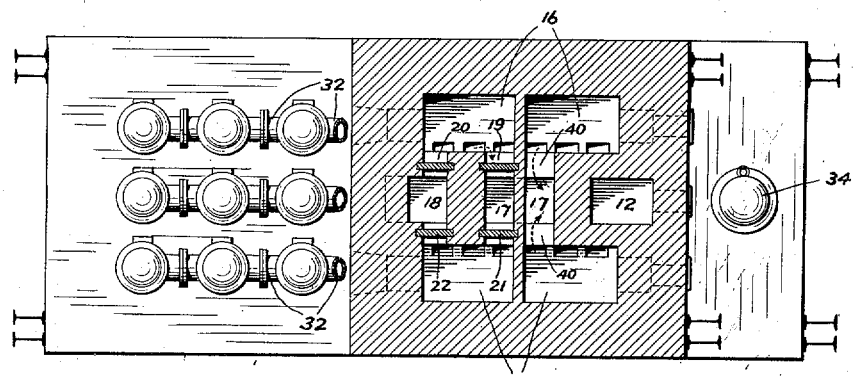
Figure 5:
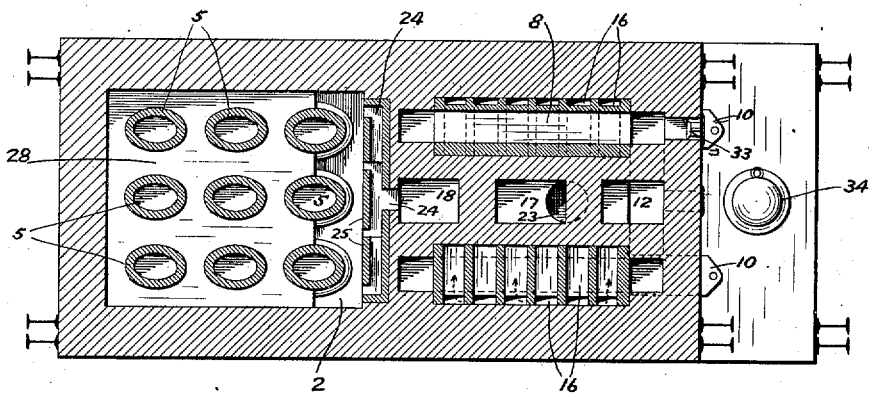
Figure 6:
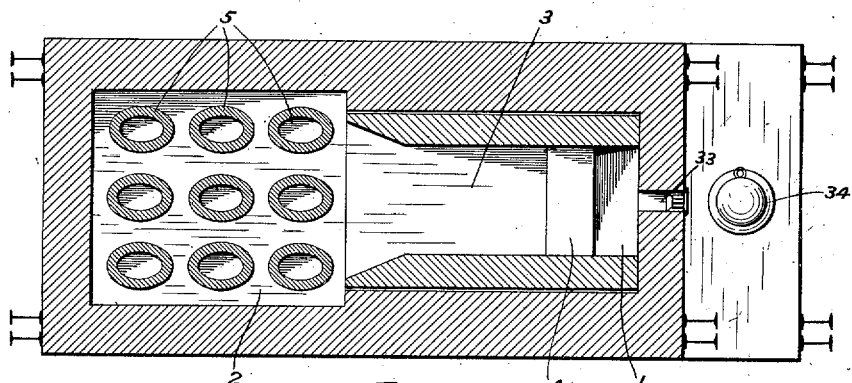
Figure 7:
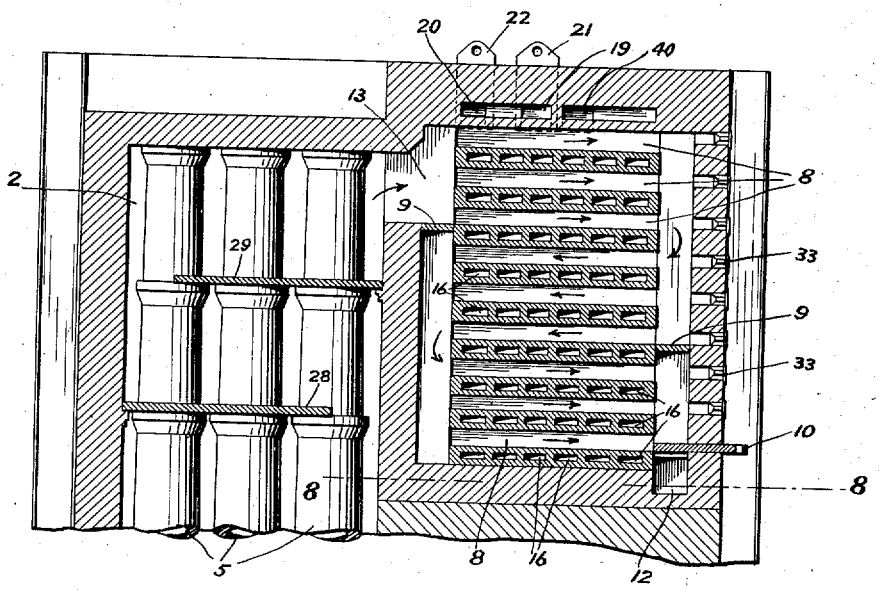
Figure 8:
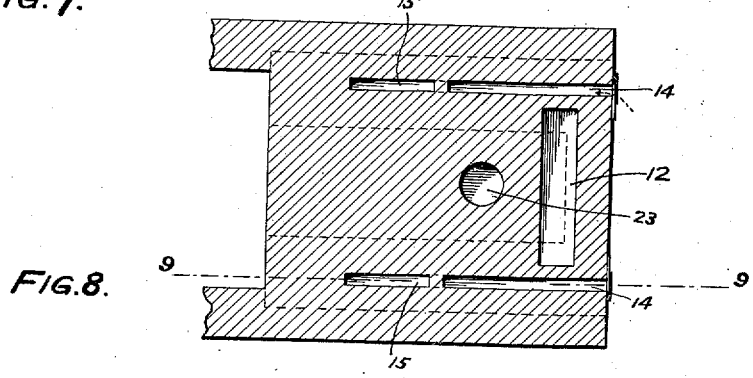
Figure 9:
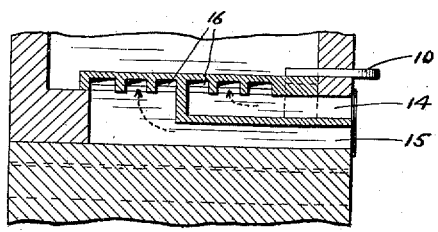

Figure 1, is a central section illustrating an apparatus embodying features of the invention. Fig. 2, is a transverse sectional view taken on the line 2—2 of Fig. 1. Fig. 3, is a transverse sectional view taken on the line 3—3 of Fig. 1. Figs. 4, 5, and 6, are horizontal sectional views taken respectively on the lines 4—4, 5—5, and 6—6, of Fig. 1. Fig. 7, is a sectional view taken on the line 7—7 of Fig. 2. Fig. 8, is a horizontal sectional view taken on the line 8—8 of Fig. 7. Fig. 9, is a vertical sectional view taken on the line 9—9 of Fig. 8, and Fig. 1$^A$, is a view partly in section illustrating a modification of the arrangement shown in Fig. 1.

In the drawings 1, is the furnace or producer having a grate 1$^a$, with primary air ports 1$^b$, beneath, and 2, is the retort chamber. The furnace or producer is set out in front so that fuel can be dropped directly into it. 3, is a chamber interposed between the furnace and retort chamber and in which the gas from the furnace or producer 1, is mingled with the secondary air, ignited and expanded and from which the hot products of combustion escape into the retort chamber 2. As shown there is a bridge wall 4, interposed between the combustion chamber 3, and the furnace chamber 1, for bringing together the secondary air and furnace gases. It may here be remarked that the outlet of the combustion chamber 3, is substantially commensurate in width with the retort chamber 2, and discharges directly into the same so that the hot products passing from the chamber 3, are directed without internal distribution means, straight to and around the various upright retorts 5. In the combustion chamber 3, occurs the mixing, ignition and expansion of the secondary air and gas from the furnace 1, and any local high temperature consequent upon this ignition is confined to that chamber, and is not directed upon the bottom of the retorts 5, so that the latter are not subjected to undue heating at the bases thereof, but are on the contrary uniformly and properly heated by the mixed and expanded products of combustion. Generally speaking the recuperators are arranged above the chambers 1 and 3, and on opposite sides of the secondary air and waste gas flues which are disposed, generally speaking centrally of the sides of the apparatus, all as will be presently described. The recuperators may be substantial duplicates of each other, so that it is only necessary to describe one of them and this course will be followed.

The super-structure including the recuperators and the secondary air and waste gas passages is more or less heavy and not so highly heated as the upper portions of the chambers 1 and 3. In the construction shown the super-structure is carried by an arch 6, separate and distinct and somewhat removed from the arch 7, which forms the upper part of the chambers 1 and 3, as is clearly shown in Figs. 1, 2, and 3. In consequence of this construction of the arches weight of the super-structure, but the arch 6, carries this weight. Furthermore the arch 7, since it is exposed to a relatively high degree of heat, is apt to require comparatively frequent renewals and repairs and these can be readily made without disturbing the super-structure, because the latter is carried by the arch 6, which is independent of the arch 7, as has been stated.

Each recuperator comprises passages or flues 8, shown as ranging from back to front of the apparatus, and between each passage 8, there are provisions which will be hereinafter described for the passage of air. By means of walls 9, the passages 8, or more accurately the spaces at their ends, are connected together first at the front and then at the back so that the hot waste products traverse the passages 8, in a zig-zag path. As shown three of the passages 8, are connected in such way that the waste gases traverse them in same direction and then the waste gases traverse three of these passages in the reverse direction, but this arrangement of the passages in groups is not material, nor is the number of passages in each group material. In the drawings the full line arrows show the direction of travel of the waste gases. 10, is a damper accessible from the exterior of the apparatus and by means of which the escape of the hot gases to the stack opening 12 is regulated. In as much as there are two dampers 10, it is evident that the outlet for the hot gases or products of each recuperator may be regulated so that the waste gases may be variously divided between the two recuperators and in this way control of the heating effect is obtained. From the retort chamber 2, the waste gases enter the recuperator by way of the passage 13, and then traverse the path which has been already described.

Secondary air is taken into the apparatus by way of the inlets 14 and 15, Fig. 9, and from these inlets 14 and 15, the air follows a zig-zag path around and between flues or passages 8, Fig. 2, and thus ascends toward the top of the apparatus. 16, are the passages or channels for the passage of air. In as much as there are two air intakes, one of which feeds a forward group of air passages 16 and the other a rearward group of air passages 16, it follows that by regulating the inlet openings of these passages it is possible to direct more or less air to the front or to the back as conditions may require or make desirable. At the top of the apparatus the heated secondary air escapes at all times into the flue 17, through an opening 40, and into air flues 17 and 18, through openings 19 and 20, which are provided with dampers 21 and 22. By adjusting these dampers more or less secondary air may be directed to the back or front secondary air flue. From the secondary air flues the secondary air escapes by way of the opening 23 to the combustion chamber 3, and if necessary or desirable to the retort chamber by way of the opening 24 in front of which and in line with the rows of retorts are arranged baffle plates 25, so that the air escapes, generally speaking, between the rows of retorts. Within the retort chamber 2, there are baffle plates 27, 28 and 29.

The material from which the illuminating gas is made is introduced at the top of the retorts 5 and is held therein by the mouth pieces or lids 30, which when opened permit of the discharge of coke, for example, into a wagon 31, or in some other appropriate way. A particular mechanism for operating these lids forms the subject-matter of my application Serially Numbered 413,785.

The gas generated or liberated in the retorts is conducted away by means of pipes and apparatus 32, which forms the subject-matter of my co-pending application for a patent Serially Numbered 413,786.

33, are properly stoppered openings arranged through the wall of the apparatus and by means of which access can be had to the interior for examination and repairs and in the case of the recuperators these openings are arranged opposite spaces in such manner that it is easy to insert through them a proper tool for luting or stopping any leaks that may occur.

The construction and arrangement illustrated in Fig. 1$^A$, is the same as has been above described, except that the furnace chamber $a^1$, is moved somewhat nearer to the center of the apparatus and its charging opening $a^2$, is arranged beneath an appropriate number, one, as shown in the drawings, of the discharge ends of the retorts 5.

In this way coke is discharged from such retort or retorts directly into the furnace chamber. It follows from this that hot coke may be conveniently used as fuel. This is also true of the construction shown in Fig. 1, because the hot coke from the discharge end of the retorts can be readily conveyed to the fuel inlet 34.

In use the retorts 5, are charged with the material from which gas is to be made and producer gas or products of combustion from the furnace 1 enter the combustion chamber 3. There they are met by the heated secondary air, ignited, expanded and brought to a comparatively high temperature, but since the secondary air is introduced comparatively near the inlet end of this chamber, this high temperature occurs sufficiently far away from the retorts to prevent them and their contents from being unduly heated at the lower portions thereof. From the combustion chamber the hot products of combustion travel in a straight path and reach all of the retorts easily and naturally and without requiring guide or baffle plates. The hot products of combustion then rise through the retort chamber 2, and are directed back and forth in their passage by the baffle plates 27, 28 and 29. At 25, additional secondary air may enter to burn the combustible gases not burned in the combustion chamber 3, and thus serve to additionally heat the upper portion of the retorts. Finally the waste gases enter the recuperators at 13, but before doing so they have heated the retorts 5 evenly and uniformly from bottom to top, but without over-heating them at any particular place or places. The waste gases pass through the recuperators in the direction indicated by the solid line arrows and reach the chimney flue 12, and the dampers 10 may be adjusted so as to direct more or less of these gases to one or the other of these recuperators and in that way the attendant by operating these dampers from the outside may control the distribution of heat. The secondary air entering at 14 and 15 traverses the recuperator in the direction indicated by the dotted line arrows and the dampers on the inlets 14 and 15 may be adjusted from the outside of the apparatus so as to distribute the air toward the front or back as the temperature conditions may require. The dampers 21 and 22 can be adjusted from the outside of the apparatus so as to distribute the secondary air between the flues 17 and 18 in order to introduce more or less of it into the retort chamber and into the combustion chamber.

For the sake of illustration nine retorts have been shown, but if more were to be employed, for example, twelve in all, the three additional retorts would be located in a row back of the rows which are now shown, so that the width of the retort chamber would not be increased, but its length would be increased. The point of this is that the width of the retort chamber is substantially the same as the width of the combustion chamber 3, so that hot products reach the side retorts naturally and without requiring to be particularly directed to them.

Some of the structural advantages of the setting have already been described, but others will obviously appear to those skilled in the art.

What I claim is:

1. In coal gas apparatus the combination of a furnace, a retort chamber above and in rear of the same, vertical retorts in the retort chamber, a combustion chamber interposed between the furnace chamber and the retort chamber and external to the latter, and recuperators superposed on the combustion and furnace chambers and having between them secondary air flues which have communication with the combustion chamber near its inlet end, substantially as described.

2. In coal gas apparatus the combination of a furnace, a retort chamber containing vertical retorts and arranged in rear of the furnace, a combustion chamber having communication with the furnace and retort chambers, recuperators and secondary air and waste gas flues arranged above the furnace and combustion chamber, and an arch adapted to support the recuperators and flues and independent and distinct from the arch which forms the top of the combustion chamber, substantially as described.

3. In coal gas apparatus the combination of a furnace, a retort chamber containing vertical retorts and arranged above and in the rear of the furnace, a combustion chamber interposed between the furnace and retort chamber, recuperators and a pair of secondary air flues superposed on the combustion chamber and one of said flues having communication with the combustion chamber and the other of said flues having communication with the retort chamber, and external dampers interposed between the recuperators and the outlets of each of said flues whereby secondary air may be variously divided and apportioned between the combustion and retort chambers, substantially as described.

4. In coal gas apparatus the combination of a retort chamber, recuperators divided into sections to provide separate passages for air, said recuperators having hot air outlets and provided with air intakes of which one appertains to the front section and the other to a rear section of a recuperator, dampers for controlling each of the air inlets, and dampers for controlling the air outlets to adjust the hot air distribution in the apparatus, substantially as described.

5. In coal gas apparatus the combination of a retort chamber containing vertical retorts, a furnace chamber, and a third chamber communicating with the furnace chamber and with the retort chamber and having its roof unloaded and free to expand and contract in respect to the setting of the apparatus and means for introducing secondary air to said third chamber, substantially as described.

In testimony whereof I have hereunto signed my name.

JOHN HAWLEY TAUSSIG.

Witnesses:
CLIFFORD K. CASSEL,
K. M. GILLIGAN.